United States Patent
Colombi et al.

(10) Patent No.: US 10,135,237 B2
(45) Date of Patent: Nov. 20, 2018

(54) SYSTEMS AND METHODS FOR EXPLOITING CURRENT CAPABILITY IN STATIC UPS

(71) Applicant: ABB Schweiz AG, Baden (CH)

(72) Inventors: Silvio Colombi, Losone (CH); Andrea Mannuccini, Locarno (CH); Luigi De Bernardi, Cernobbio (IT)

(73) Assignee: ABB Schweiz AG, Baden (CH)

( * ) Notice: Subject to any disclaimer, the term of this patent is extended or adjusted under 35 U.S.C. 154(b) by 875 days.

(21) Appl. No.: 14/568,817

(22) Filed: Dec. 12, 2014

(65) Prior Publication Data

US 2016/0036216 A1 Feb. 4, 2016

Related U.S. Application Data

(60) Provisional application No. 62/030,847, filed on Jul. 30, 2014.

(51) Int. Cl.

| | |
|---|---|
| *H02H 9/02* | (2006.01) |
| *H02M 1/32* | (2007.01) |
| *H02J 9/06* | (2006.01) |
| *G06F 1/30* | (2006.01) |
| *H02J 3/38* | (2006.01) |
| *G06F 1/26* | (2006.01) |

(52) U.S. Cl.
CPC ............... *H02H 9/02* (2013.01); *G06F 1/266* (2013.01); *G06F 1/30* (2013.01); *H02J 3/38* (2013.01); *H02J 9/061* (2013.01); *H02J 9/062* (2013.01); *H02M 1/32* (2013.01)

(58) Field of Classification Search
CPC ..... H02M 1/32; H02J 9/062; H02J 3/38; H02J 9/061; H02H 9/02; G06F 1/30
See application file for complete search history.

(56) References Cited

U.S. PATENT DOCUMENTS

| | | | |
|---|---|---|---|
| 3,750,004 A | 7/1973 | Walker | |
| 4,489,371 A | 12/1984 | Kernick | |
| 5,210,685 A | 5/1993 | Rosa | |
| 5,361,196 A * | 11/1994 | Tanamachi | B60L 9/22 318/811 |
| 6,191,500 B1 | 2/2001 | Toy | |

(Continued)

FOREIGN PATENT DOCUMENTS

WO 8808218 A1 10/1988

OTHER PUBLICATIONS

"Isolated-Parallel UPS Configuration". Herbener, Frank. Dec. 31, 2013.*

(Continued)

*Primary Examiner* — Ronald W Leja
*Assistant Examiner* — Christopher Clark
(74) *Attorney, Agent, or Firm* — Barnes & Thornburg LLP

(57) ABSTRACT

A system is provided. The system includes a plurality of uninterruptible power supplies (UPSs), each UPS of the plurality of UPSs including an inverter, a ring bus, and at least one controller communicatively coupled to the plurality of UPSs, the at least one controller configured to control at least one bridge current in each UPS, the at least one bridge current controlled such that the inverter of each UPS operates in a partial current limiting regime between a full current limiting regime and a linear mode.

23 Claims, 9 Drawing Sheets

(56) References Cited

U.S. PATENT DOCUMENTS

| | | | |
|---|---|---|---|
| 6,657,320 B1 | 12/2003 | Andrews et al. | |
| 7,425,779 B2 | 9/2008 | Luo et al. | |
| 7,459,803 B2 | 12/2008 | Mosman | |
| 2013/0223114 A1* | 8/2013 | Nakayama | H02M 1/32 363/55 |
| 2014/0003103 A1* | 1/2014 | Aaltio | H02M 1/32 363/56.03 |
| 2014/0167809 A1* | 6/2014 | Sebald | G01R 31/42 324/764.01 |
| 2014/0183955 A1* | 7/2014 | Colombi | H02J 3/38 307/64 |
| 2014/0209415 A1* | 7/2014 | Hall | H02J 9/062 187/290 |

OTHER PUBLICATIONS

Bekiarov et al., "Uninterruptible Power Supplies: Classification, Operation, Dynamics, and Control", Applied Power Electronics Conference and Exposition, 2002, IEEE, pp. 597-604, vol. 1.
Windhorn, "A Hybrid Static/Rotary UPS System", IEEE, pp. 541-545, vol. 28, Issue 3.

* cited by examiner

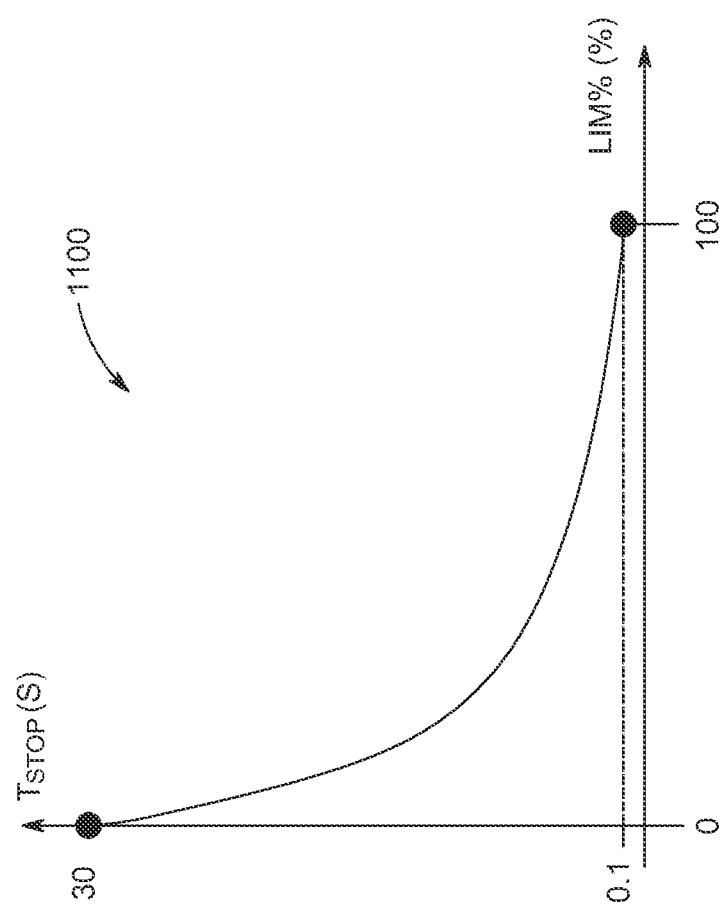

SYSTEMS AND METHODS FOR EXPLOITING CURRENT CAPABILITY IN STATIC UPS

CROSS REFERENCE TO RELATED APPLICATIONS

This application is a non-provisional application and claims priority to U.S. Provisional Patent Application Ser. No. 62/030,847 filed Jul. 30, 2014 for "SYSTEMS AND METHODS FOR EXPLOITING CURRENT CAPABILITY IN STATIC UPS", which is hereby incorporated by reference in its entirety.

BACKGROUND

The field of the invention relates generally to uninterruptible power supplies, and more particularly, to operating inverters in a partial current limiting regime.

Robust power systems enable supplying power to one or more loads. Such power systems may include combinations of generation, transport, rectification, inversion and conversion of power to supply energy for electronic, optical, mechanical, and/or nuclear applications and loads. When implementing power systems and architectures, practical considerations include cost, size, reliability, and ease of implementation.

In at least some known power systems, one or more uninterruptible power supplies (UPSs) facilitate supplying power to a load. UPSs facilitate ensuring that power is continuously supplied to one or more critical loads, even when one or more components of a power system fail. Accordingly, UPSs provide a redundant power source. UPSs may be utilized in a number of applications (e.g., utility substations, industrial plants, marine systems, high security systems, hospitals, datacomm and telecomm centers, semiconductor manufacturing sites, nuclear power plants, etc.). Further, UPSs may be utilized in high, medium, or low power applications. For example, UPSs may be used in relatively small power systems (e.g., entertainment or consumer systems) or microsystems (e.g., a chip-based system).

BRIEF DESCRIPTION

In one aspect, a system is provided. The system includes a plurality of uninterruptible power supplies (UPSs), each UPS of the plurality of UPSs including an inverter, a ring bus, and at least one controller communicatively coupled to the plurality of UPSs, the at least one controller configured to control at least one bridge current in each UPS, the at least one bridge current controlled such that the inverter of each UPS operates in a partial current limiting regime between a full current limiting regime and a linear mode.

In another aspect, at least one controller for controlling a power supply system that includes a ring bus and plurality of uninterruptible power supplies (UPSs) is provided. The at least one controller includes a processor, and a memory device communicatively coupled to the processor, the memory device storing executable instructions configured to cause the processor to control at least one bridge current in each UPS of the plurality of UPSs, the at least one bridge current controlled such that an inverter of each UPS operates in a partial current limiting regime between a full current limiting regime and a linear mode.

In yet another aspect, a method of controlling a power supply system that includes a ring bus and a plurality of uninterruptible power supplies (UPSs) each including an inverter is provided. The method includes monitoring at least one bridge current in each UPS of the plurality of UPSs, and controlling the at least one bridge current such that the inverter of each UPS operates in a partial current limiting regime between a full current limiting regime and a linear mode.

BRIEF DESCRIPTION OF THE DRAWINGS

FIG. 9 is a graph illustrating characteristics to determine a stop operation time.

DETAILED DESCRIPTION

The systems and methods described address technical challenges related to the use of static UPSs in ring bus architectures. In particular, the size of chokes can be reduced by utilizing a current limiting algorithm that provides additional time to deal with a breaker that fails to open. This also has additional advantages related to cost, feasibility, and viability of a static UPS architecture.

Exemplary embodiments of an uninterruptible power supply system are described here. A plurality of uninterruptible power supplies are arranged in a ring bus configuration and configured to supply power to at least one load. At least one control device is communicatively coupled to the plurality of uninterruptible power supplies.

Figure 1:
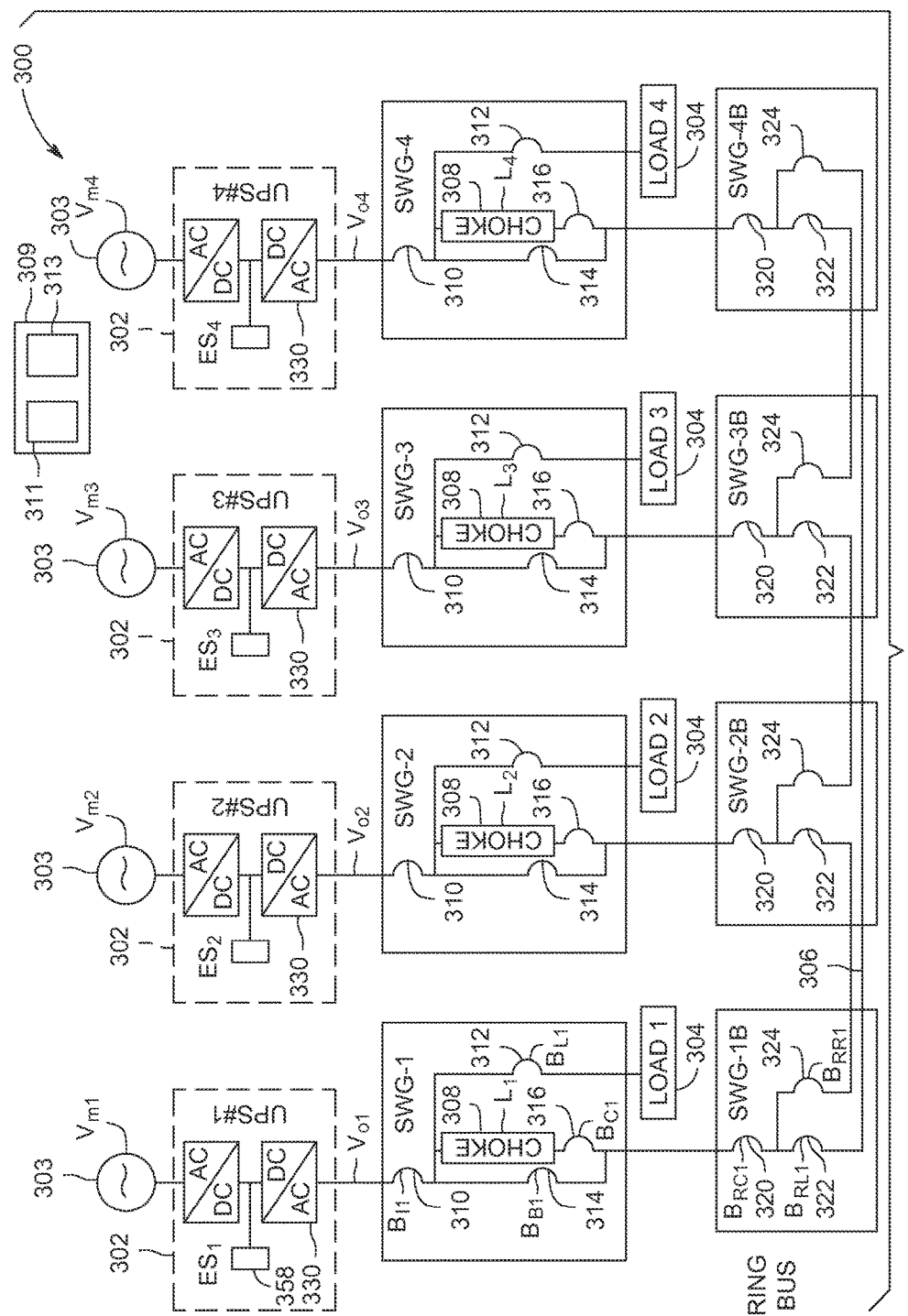
FIG. 1 is a diagram of an exemplary ring bus architecture.

FIG. 1 is a schematic diagram of an exemplary redundant isolated-parallel (IP) uninterruptible power supply (UPS) ring bus architecture 300. In the exemplary embodiment, architecture 300 includes a plurality of UPSs 302 arranged in a ring architecture, or parallel architecture, as described herein. Specifically, architecture 300 includes four UPSs 302 in the exemplary embodiment. Alternatively, architecture 300 may include any number of UPSs 302 that enable architecture 300 to function as described herein. In the exemplary embodiment, architecture 300 is a three wire system. Alternatively, architecture 300 may be a four wire system (typically to supply loads that require a neutral wire).

In the exemplary embodiment, UPSs 302 are static double conversion UPSs (i.e., true on-line system systems). Both static and rotary UPSs may require droop control techniques for both voltage and frequency. In some cases, droop control for frequency alone may be sufficient. In some embodiments, droop control techniques are modified in order to handle non-linear loads.

Architecture 300 facilitates providing power to one or more loads 304. Under normal operation, one or more utilities function as a voltage source 303 and provide power alternating current (AC) power to loads 304. Generators may also function as voltage sources 303. Notably, voltage sources 303 do not need to be synchronized in architecture 300. This is advantageous, as every UPS 302 may be fed by an individual generator and/or utility, and there is no need to add additional equipment to synchronize voltage sources 303.

In the event of a failure of voltage source 303 or of the UPS rectifier, UPS 302 utilizes energy storage systems 358 (e.g., batteries, flywheels, etc. with their converter) connected to UPSs 302 to keep power flowing to loads 304, as described herein. Further, if a given UPS 302 fails, loads 304 are fed power through a ring bus 306, as described herein. In the exemplary embodiment, architecture 300 includes four loads 304. Alternatively, architecture 300 may include any suitable number of loads 304 that enable architecture 300 to function as described herein.

In the exemplary embodiment, each UPS 302 is electrically coupled to an associated load 304, and coupled to ring bus 306 through an associated choke 308 (e.g., an inductor). In architecture 300, without proper synchronization, UPSs 302 cannot work properly due to undesirable circulation currents. Accordingly, in the exemplary embodiment, at least one controller 309 controls operation of UPSs 302. More specifically, at least one controller 309 controls a frequency of an output voltage of each UPS 302, as described herein. The frequency for each UPS 302 is calculated as a function of power, as described herein.

In some embodiments, architecture 300 includes a separate, dedicated controller 309 for each UPS 302. Alternatively, system may include a single controller 309 that controls operation of all UPSs 302. Each controller 309 may include its own power system (not shown) such as a dedicated energy source (e.g., a battery). In some embodiments, each controller 309 is coupled to a substitute controller (not shown) that may be used in the event that controller 309 fails.

In the exemplary embodiment, each controller 309 is implemented by a processor 311 communicatively coupled to a memory device 313 for executing instructions. In some embodiments, executable instructions are stored in memory device 313. Alternatively, controller 309 may be implemented using any circuitry that enables controller 309 to control operation of UPSs 302 as described herein. For example, in some embodiments, controller 309 may include a state machine that learns or is pre-programmed to determine information relevant to which loads 304 require power.

In the exemplary embodiment, controller 309 performs one or more operations described herein by programming processor 311. For example, processor 311 may be programmed by encoding an operation as one or more executable instructions and by providing the executable instructions in memory device 313. Processor 311 may include one or more processing units (e.g., in a multi-core configuration). Further, processor 311 may be implemented using one or more heterogeneous processor systems in which a main processor is present with secondary processors on a single chip. As another illustrative example, processor 311 may be a symmetric multi-processor system containing multiple processors of the same type. Further, processor 311 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 311 causes controller 309 to operate UPSs 302, as described herein.

In the exemplary embodiment, memory device 313 is one or more devices that enable information such as executable instructions and/or other data to be stored and retrieved. Memory device 313 may include one or more computer readable media, such as, without limitation, dynamic random access memory (DRAM), static random access memory (SRAM), a solid state disk, and/or a hard disk. Memory device 313 may be configured to store, without limitation, application source code, application object code, source code portions of interest, object code portions of interest, configuration data, execution events and/or any other type of data.

In the exemplary embodiment, as described in more detail below, one or more controllers 309, and more specifically processor 311, calculates an output voltage frequency for each UPS 302, and one or more controllers 309 operate each UPS 302 at the calculated frequency. Operating each UPS 302 at their respective calculated frequencies as determined by the droop controls makes it possible to achieve load sharing and stability in architecture 300. The frequencies of operation across the various UPSs 302 are different in transient conditions (e.g., following a variation of one or more loads 304). Once the droop controls are in steady state, all UPSs 302 operate at the same frequency but with a phase shift across chokes 308 that equalizes the active power provided by each UPS 302.

In architecture 300, each UPS 302 is able to supply power to an associated local load 304, as well as transfer active and reactive power to ring bus 306 through an associated choke 308. In the exemplary embodiment, architecture 300 facilitates sharing local loads 304 equally between UPSs 302 without any communication using droop controls, and in particular, frequency versus active power and voltage versus reactive power. This removes limitations on the number of UPSs 302 in architecture 300.

In the exemplary embodiment, architecture 300 includes a number of circuit breakers. Specifically, for each UPS 302, a first circuit breaker 310 is electrically coupled between UPS 302 and choke 308, a second circuit breaker 312 is electrically coupled between first circuit breaker 310 and local load 304, a third circuit breaker 314 is electrically coupled between first circuit breaker 310 and ring bus 306, and a fourth circuit breaker 316 is coupled between choke 308 and ring bus 306. Further, at ring bus 306, a central circuit breaker 320, a left circuit breaker 322, and a right circuit breaker 324 are associated with each UPS 302, and facilitate isolating UPS 302 from ring bus 306 and/or other UPSs 302 on ring bus 306. Each circuit breaker 310, 312, 314, 316, 320, 322, and 324 includes associated logic and relays (neither shown) for operation. The protection scheme provided by circuit breakers 310, 312, 314, 316, 320, 322, and 324 facilitates locating faults in architecture 300 and isolating those faults by opening the appropriate breakers. Further, third circuit breakers 314, also referred to as bypass breakers, facilitate bypassing choke 308 when the associated UPS 302 fails or is under maintenance. This facilitates improving the quality of the voltage on the associated local load 304 as the voltage drop on choke 308 is removed.

For ring bus applications, chokes 308 are sized to sustain a bolted fault on ring bus 306 for a long enough time to guarantee isolation of the fault through the activation of the specific breakers in architecture 300. Further, for situations where a breaker fails to open, additional time should be built-in to determine and execute an alternative fault isolation strategy. Accordingly, to facilitate maximizing a duration of time where the inverter in an associated UPS 302 can sustain a bolted fault on ring bus 306, chokes 308 may be sized to operate the inverter in a linear mode under a short circuit on ring bus 306. The systems and methods described herein facilitate maximizing the operation time in intermittent current limited periods to provide a longer available time to deal with a scenario where a breaker fails to open. Accordingly, the size of chokes 308 may be reduced somewhat.

As shown in FIG. 1, each UPS 302 includes an inverter 330. Different designs are possible for inverters 330. For example, for transformerless designs, FIG. 2 is a circuit diagram of an exemplary single phase voltage source two level inverter 400, and FIG. 3 is a circuit diagram of an exemplary single phase voltage source three level inverter 500.

Figure 2:
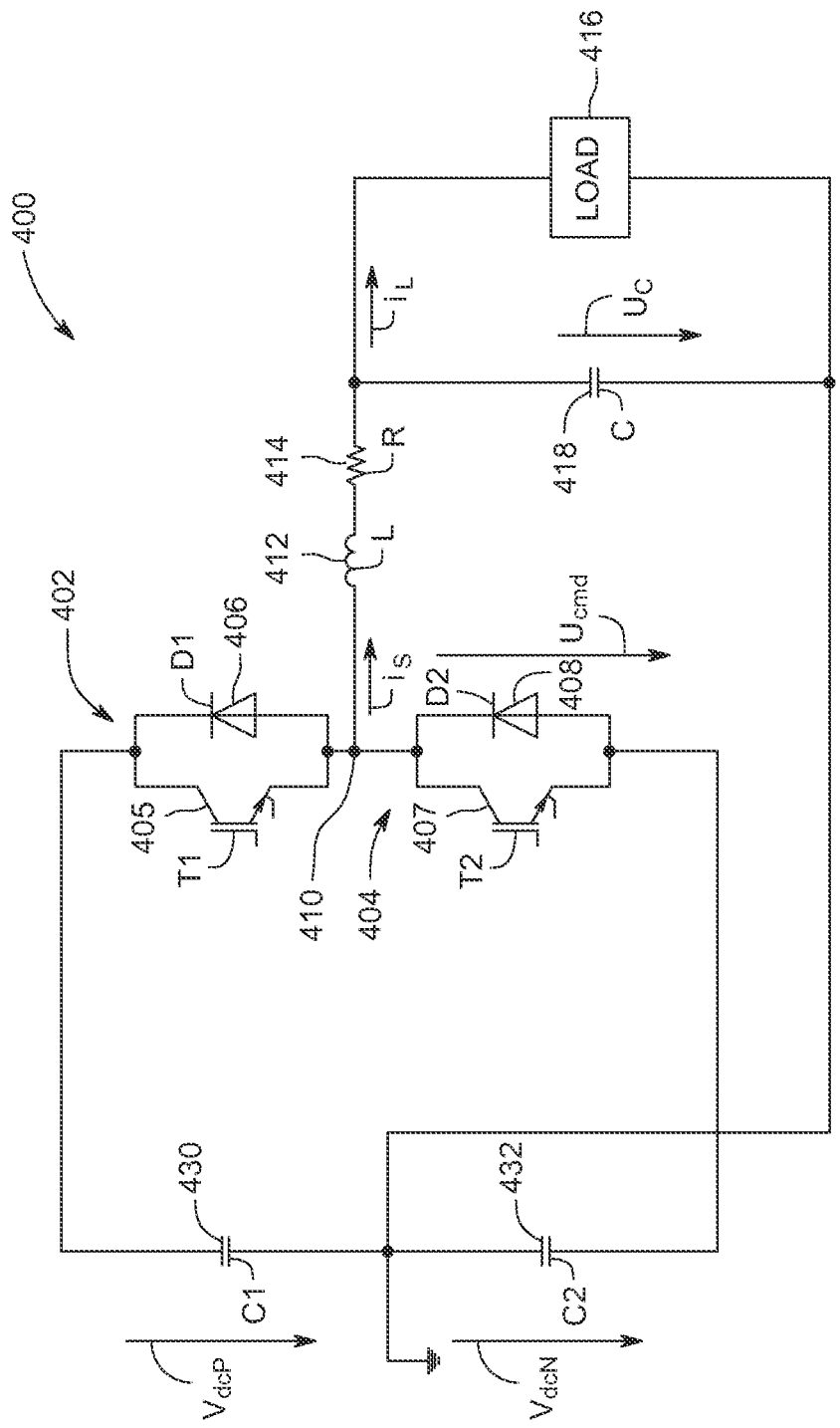
FIG. 2 is a circuit diagram of an exemplary single phase voltage source two level inverter.
Figure 3:
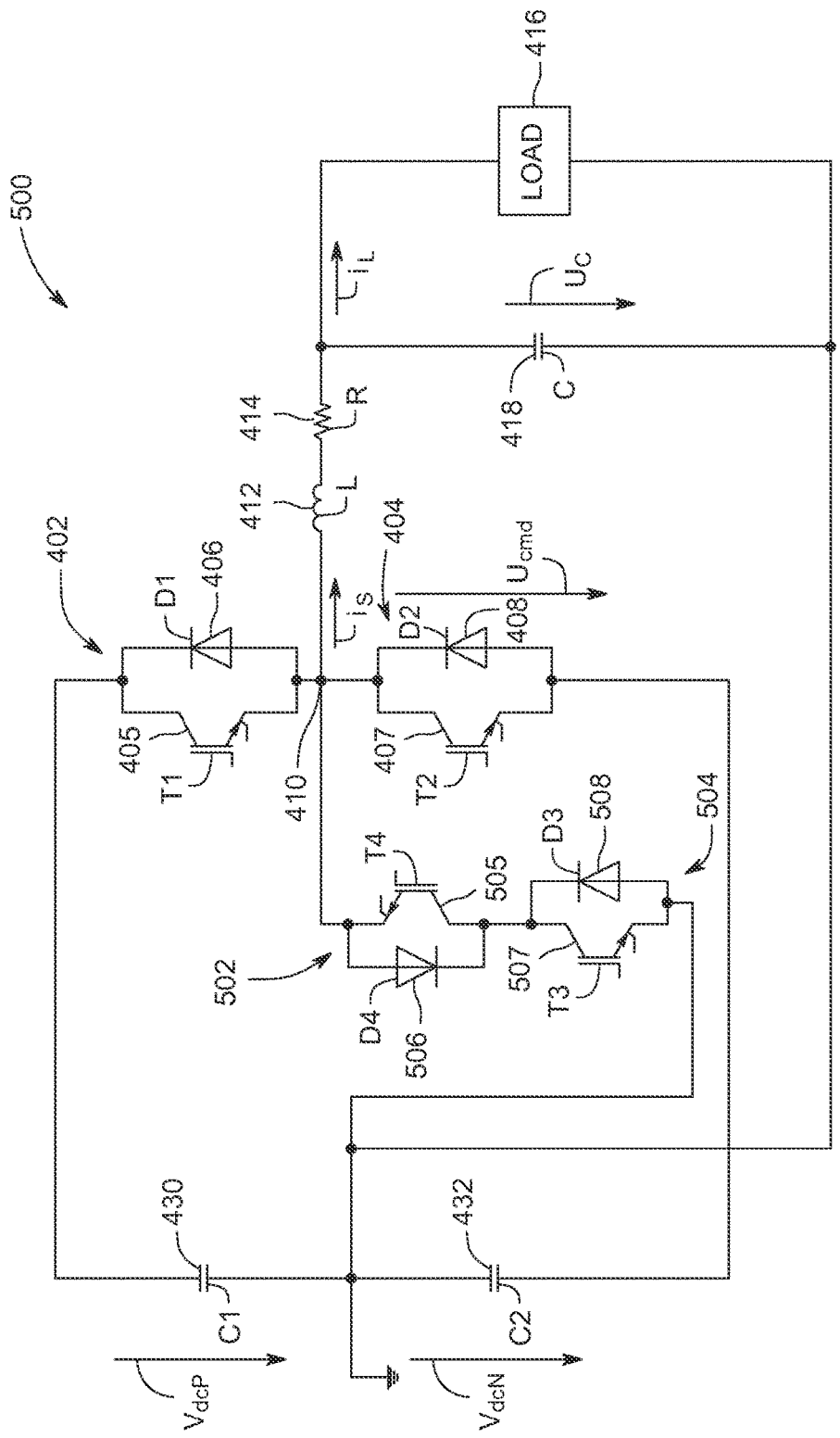
FIG. 3 is a circuit diagram of an exemplary single phase voltage source three level inverter.

As shown in FIG. 2, inverter 400 includes a first switching device 402 and a second switching device 404. First switching device 402 includes a first switch 405 (e.g., a transistor) electrically coupled in parallel with a first diode 406, and second switching device 404 includes a second switch 407 (e.g., a transistor) electrically coupled in parallel with a second diode 408. A voltage across the lower, or second switching device 404 is referred to herein as a command voltage, $u_{cmd}$. A node 410 between first and second switching devices 402 and 404 outputs a bridge current, $i_s$, through an inductor 412 and a resistor 414. Bridge current $i_s$ splits into a load current, $i_L$, that flows to load 416 (such as local load 304) and a current that flows through a capacitor 418. A voltage across capacitor 418 is referred to as a capacitor voltage, $u_C$. Inverter 400 includes a first DC capacitor 430 electrically coupled between first switching device 402 and neutral 420, and a second DC capacitor 432 electrically coupled between second switching device 404 and neutral 420. The voltage across first DC capacitor 430 is an upper DC link voltage, $V_{dcP}$, and the voltage across second DC capacitor 432 is a lower DC link voltage, $V_{dcN}$. As will be appreciated by those of skill in the art, for a three-phase system, three bridge currents would be controlled as described herein.

Unless indicated otherwise, inverter 500 is substantially similar to inverter 400. As shown in FIG. 3, inverter 500 includes a third switching device 502 and a fourth switching device 504 electrically coupled in series between node 410 and neutral 420. Third switching device 502 includes a third switch 505 (e.g., a transistor) electrically coupled in parallel with a third diode 506, and fourth switching device 504 includes a fourth switch 507 (e.g., a transistor) electrically coupled in parallel with a fourth diode 508. Third and fourth switching devices 502 and 504 implement a bi-directional switching device. Alternatively, the bi-directional switching device may be implemented using other components (e.g., using reverse blocking devices). The topologies of inverter 400 and inverter 500 may be implemented as three phase converters by using three legs.

Figure 4:
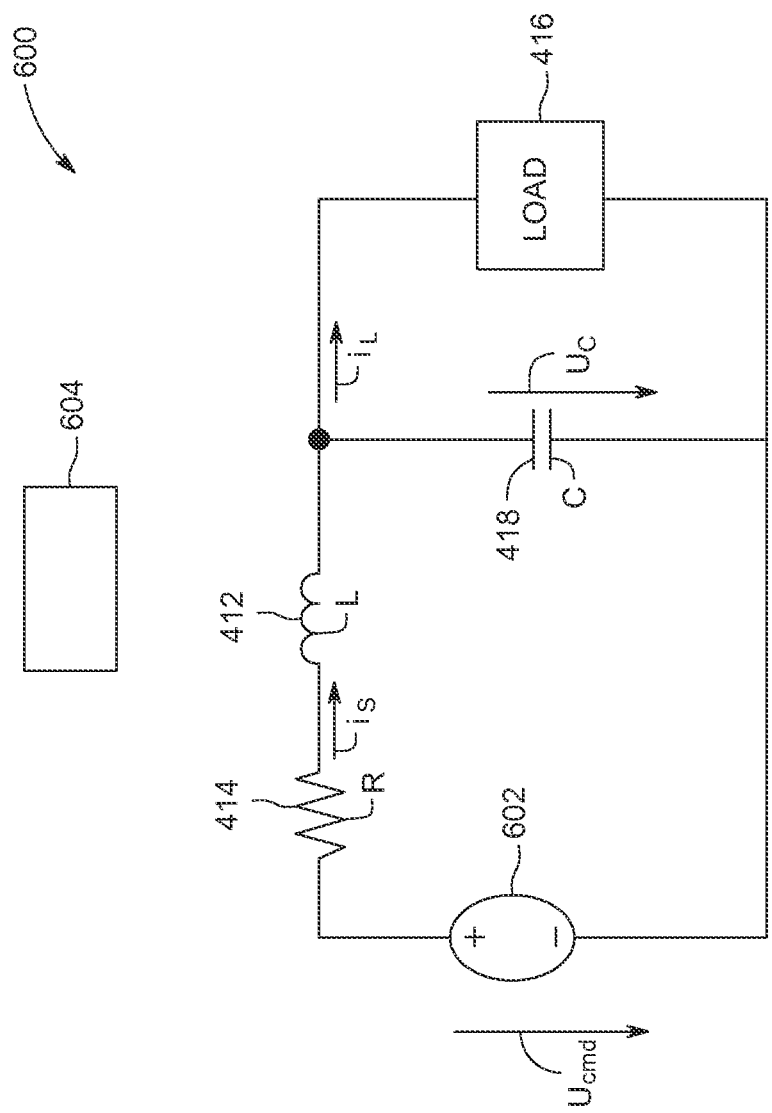
FIG. 4 is a simplified circuit diagram of a single phase inverter.

For both inverter 400 and inverter 500, FIG. 4 is a circuit diagram of the equivalent circuit 600 of a single phase inverter. Circuit 600 includes the command voltage $u_{cmd}$ represented as a voltage source 602. The discontinuous command voltage $u_{cmd}$ models the two or three level inverter. Hence, this voltage may have square wave variations between two or three possible values. In the exemplary embodiment, a controller 604, such as controller 309 (shown in FIG. 1), controls operation of one or more components of circuit 600.

Figure 5:
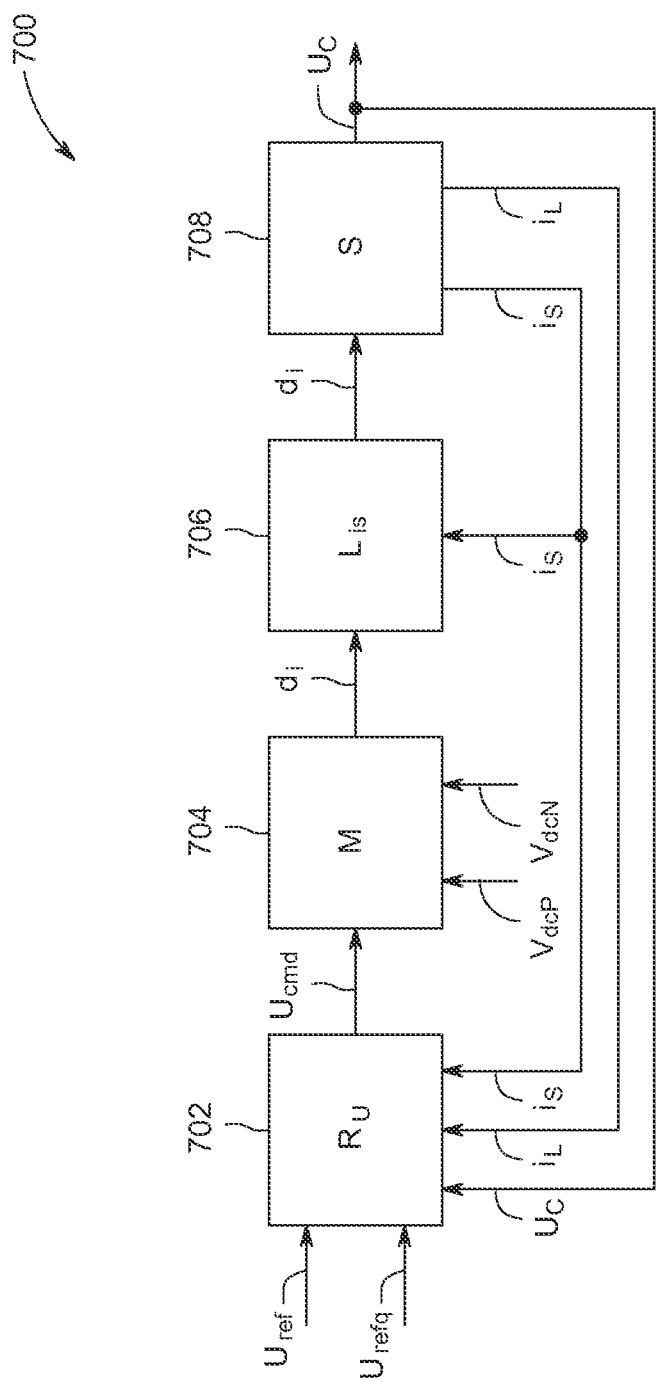
FIG. 5 is a block diagram of a voltage control algorithm with current limitation that may be used with the circuit shown in FIG. 4.

FIG. 5 is a block diagram 700 of an exemplary voltage control algorithm with current limitation that may be used with circuit 600. The steps of block diagram 700 may be performed, for example, using controller 604 (shown in FIG. 4). In block diagram 700, a voltage control block 702, implements and determines the command voltage $u_{cmd}$ based on a reference voltage, $u_{ref}$, a quadrature reference voltage, $u_{refQ}$, the capacitor voltage $u_c$, the load current $i_L$ and the bridge current $i_s$. The reference voltage $u_{ref}$ and quadrature reference voltage $u_{refQ}$ may be predetermined values stored in a memory, such as memory device 313 (shown in FIG. 1). Alternatively, the reference voltage $u_{ref}$ and quadrature reference voltage $u_{refQ}$ may be computed using equations, for example, in the following manner: $u_{ref}=A*\sin(2*\pi*f*time)$ and $u_{refQ}=B*\cos(2*\pi*f*time)$.

A modulation block 704, M, implements modulation that determines gating signals $d_i$ for power switches (e.g., gating signals $d_1$ and $d_2$ for first and second switches 405 and 407 of inverter 400, and gating signals $d_1 \ldots d_4$ for first, second, third, and fourth switches 405, 407, 505, and 507 of inverter 500). The modulation is adapted as a function of the instantaneous voltages $V_{dcP}$ and $V_{dcN}$ of the upper and lower DC links, respectively. A limitation block 706, $L_{is}$, implements a bridge current limitation that can modify the gating signals $d_i$ for the power switches. In the exemplary embodiment, limitation block 706 uses a hysteresis comparator to check if the bridge current $i_s$ exceeds a predefined current limit, $I_{smax}$.

In particular, considering a positive current, when the bridge current $i_s$ exceeds the limit $I_{smax}$, the gating signals $d_i$ for the switches are modified in such a way to make the current $i_s$ decrease. This depends on the topology of the inverter used. As an example, consider inverter 400 of FIG. 2. For a positive and increasing current $i_s$, first switch 405 is closed and second switch 407 is open. If the current $i_s$ exceeds the limit $I_{smax}$, first switch 405 is commanded to open by limitation block 706. As a result, the current $i_s$ will flow through second diode 408 and will decrease as the LC filter formed by inductor 412 and capacitor 418 is reverse biased. When the current falls below a lower maximal limit $I_{smaxLOW}$ (e.g., approximately 70% of $I_{smax}$), voltage control block 702 and modulation block 704 take over the control again. Control is performed similarly for a negative current, by operating switches to cause the negative bridge current $i_s$ to increase (i.e., move towards zero current) once the negative bridge current $i_s$ falls below a limit $-I_{smax}$.

Limitation block 706 can implement additional features to improve performance in embodiments including a three level inverter (e.g., inverter 500). For example, in inverter 500, the bi-directional switching device formed by third and fourth switching devices 502 and 504 may be used during the current limiting process in order to avoid two level commutations (i.e., from $V_{dcP}$ to $-V_{dcN}$ or the reciprocal thereof). For example, for a positive and increasing bridge current $i_s$, exceeding the limit $I_{smax}$, switches 405, 407, 506, and 508 are commanded by limitation block 706 in order to commutate the command voltage $U_{cmd}$ from $V_{dcP}$ to 0 and then $-V_{dcN}$. This reduces commutation overvoltage on the switches.

In block diagram 700, a system block 708, S, represents the controlled system, in particular the inverter bridge and the LC filter (see FIGS. 2-4). For a three phase system, a three phase inverter may be used in combination with a different controller 604 for every phase. Alternatively, the current limiting strategy described herein may be implemented using a space vector approach.

Figure 6:
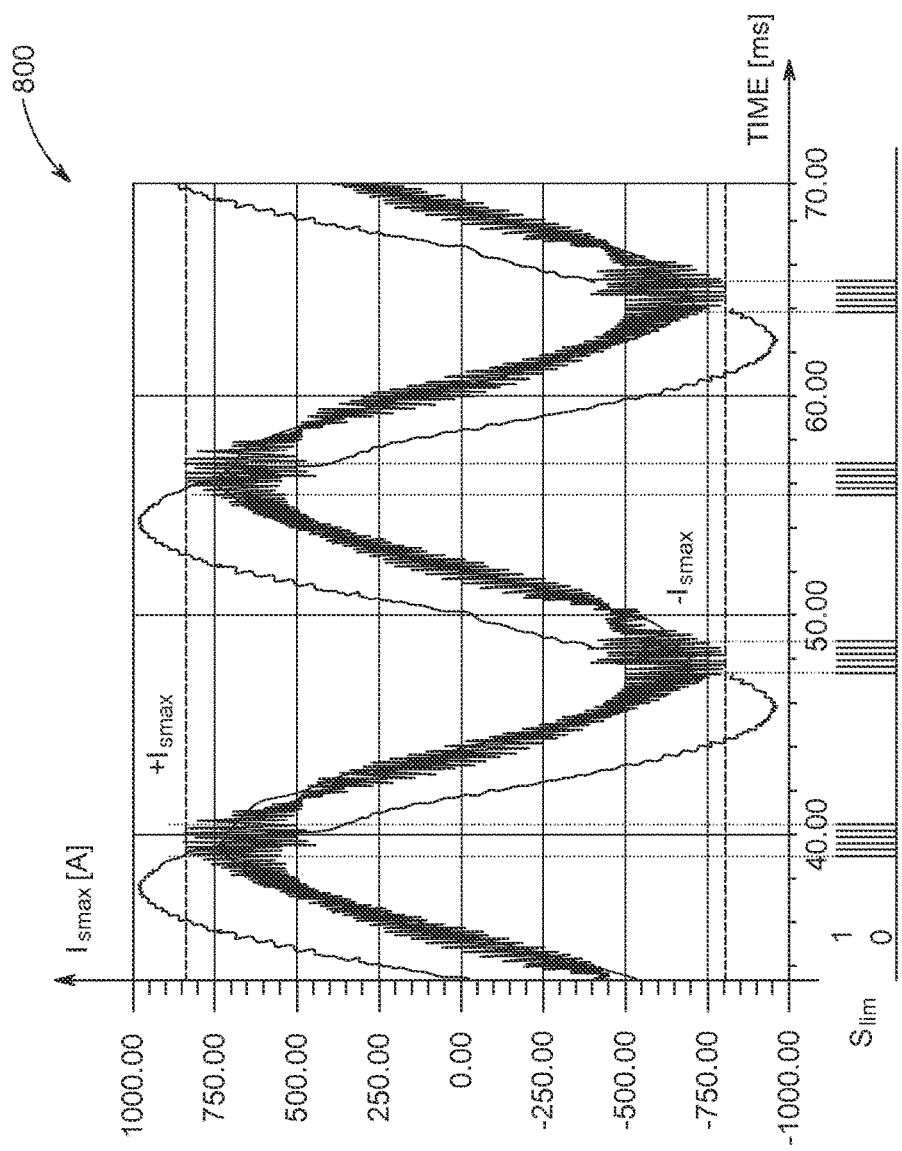
FIG. 6 is a graph illustrating periods of current limiting.

This operation of block diagram 700 is illustrated in FIG. 6, which is a graph 800 that illustrates periods of current limiting when $s_{lim}=1$. The current limiting operation of block diagram 700 may be controlled by a timer mechanism implemented using controller 604 that triggers when the current limit $I_{smax}$ is first hit and then checks the duration against a defined limit (e.g., 100 milliseconds (ms)). To facilitate optimizing the design of inverters in architecture 300, the current limit may be set slightly above the typical maximum 150% overload capability of the inverters that can usually be sustained for 30 seconds(s).

Figure 7:
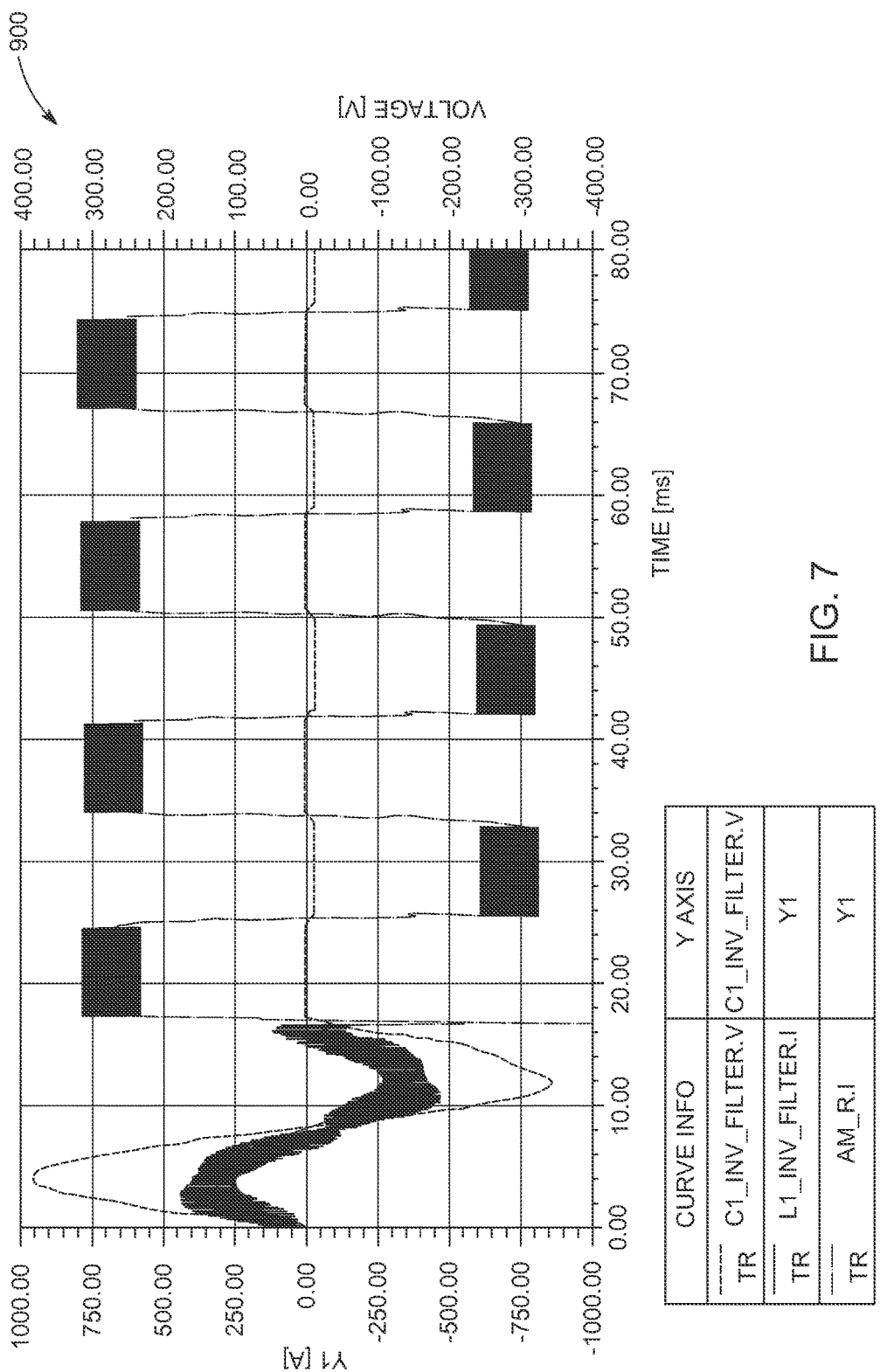
FIG. 7 is a graph showing a short circuit on a UPS output with sustained current limiting.

FIG. 7 is a graph 900 showing operation of a full current limiting regime. As demonstrated by graph 900, in a full current limiting regime, an inverter delivers a square wave current of typically 2.2 times a nominal current for a limited time (e.g., 100 ms), for example, to blow output fuses. Accordingly, a typical full current limiting regime may only be sustainable for approximately 100 ms. As shown in FIG. 7, in the full current limiting regime, the current alternates between positive and negative peak currents.

In contrast to utilizing a full current limiting region, the algorithm of block diagram 700 facilitates exploiting the current capability of the inverter in a region between a full current limiting regime, such as that shown in FIG. 7, and a maximum overload condition in linear mode (i.e. without current limiting) that generally (e.g., for economic reasons) occurs at 150% overload. In other words, operating inverters in accordance with the algorithm of block diagram 700 provides a variable time (e.g. from 100 ms up to 30 s) where a partial current limiting regime can be sustained.

Figure 8:
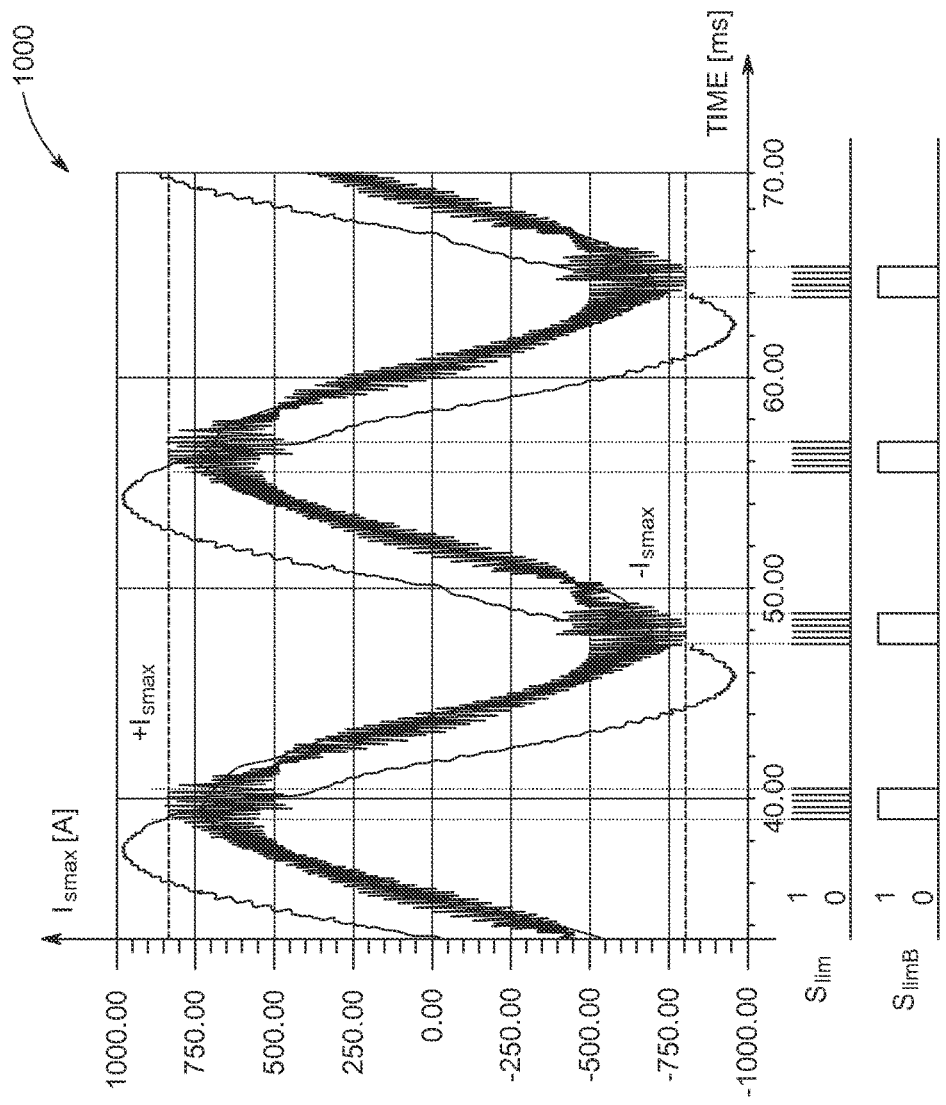
FIG. 8 is a graph illustrating periods of current limiting.

The implementation of this current limiting algorithm described herein utilizes a measurement of an actual limiting percentage time. For this, a signal $s_{limB}$ is generated at the occurrence of bursts of current limiting periods as shown in graph 1000 of FIG. 8. FIG. 8 shows periods of current limiting when $s_{lim}=1$. $s_{limB}$ shows the occurrence of bursts of current limiting periods. The current limiting percentage time is computed per Equation 1:

$$\text{LIM \%} = \frac{1}{T_s} \int_{T_s} s_{limB} \, dt \qquad \text{Equation 1}$$

where $T_s$ represents the period of a fundamental wave (e.g., 20 ms for a 50 Hz frequency). The use of the actual current limiting percentage time, LIM %, allows the system to sustain operation for a longer period of time (e.g., 300-400 ms), providing more time to clear a fault.

Moreover, a stop operation time is determined from a predefined characteristic $T_{STOP}=f(\text{LIM \%})$ as shown on graph 1100 of FIG. 9. In the exemplary embodiment, the stop operation characteristic $T_{STOP}=f(\text{LIM \%})$ is determined based on the design of the inverter, and in particular, the type and caliber of the semiconductor switches, the cooling system, etc. In some embodiments, the stress on the semiconductor switches in this mode of operation is analyzed using a thermal model or real measurements. As shown in FIG. 9, lowering LIM % increases the stop operation time, providing more time to handle failure of one or more breakers 310, 312, 314, 316, 320, 322, and 324. In an alternative embodiment, the stop operation time is determined using a thermal model that estimates in real time the junction temperature of the semiconductors.

The systems and methods described herein utilize a control algorithm that exploits the current capability of an inverter in a region between a full current limiting regime (i.e., square wave operation) and a maximum overload condition in linear mode (i.e., without current limiting). In other words, embodiments described herein provide a variable time where a partial current limiting regime can be sustained. This provides advantages in many different configurations and/or architectures of UPS systems.

For single UPS or traditional parallel UPS architectures (N+1 redundant, 2N, etc.), the systems and methods described herein provide increased capability to afford extended operation time in intermittent current limited periods. In turn, this increases the reliability of the critical power system as it substantially delays a transition from inverter to bypass.

Further, the systems and methods described address technical challenges related to the use of static UPS in ring bus architectures. In particular, the size of chokes can be somewhat reduced, because the current limiting algorithm provides a longer time in the partial current limiting regime. This also has additional advantages related to cost, feasibility, and viability of the static UPS architecture.

The systems and methods described herein are applicable independent of voltage level, and more particularly, are applicable to both low voltage (LV) (e.g., 480V phase-phase) and medium voltage (MV) (e.g., 13.8 kV phase-phase) applications. For example, although the inverter topologies described herein are typically used in LV systems, the principles of the embodiments described herein can be equally applied to MV systems using appropriate inverter technologies.

As compared to at least some known power systems, the systems and methods described herein facilitate operating inverters between a full current limiting regime and a linear mode. Further, controlling bridge currents using the systems and methods described herein provides a UPS system with additional time to resolve a fault, as described herein.

Exemplary embodiments of systems and methods for uninterruptible power supplies are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

At least one technical effect of the systems and methods described herein includes (a) monitoring at least one bridge current in each UPS of a plurality of UPSs; and (b) controlling the at least one bridge current such that an inverter of each UPS operates in a partial current limiting regime between a full current limiting regime and a linear mode.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a plurality of uninterruptible power supplies (UPSs), each UPS of the plurality of UPSs comprising an inverter;
a ring bus coupled to each UPS of the plurality of UPSs; and
at least one controller communicatively coupled to said plurality of UPSs, said at least one controller configured to:
control at least one bridge current in each UPS,
compare the at least one bridge current to a predefined current limit; and, in the event the at least one bridge current in a respective UPS exceeds the predefined current limit,
modify gating signals for switches in said respective UPS such that said inverter operates in a partial current limiting regime, defined by intermittent periods of full current limiting and linear mode operation, for a predetermined duration based on the portion of time the bridge current is actually being limited while operating in said partial current limiting regime.

2. A system in accordance with claim 1, wherein said at least one controller is configured to modify gating signals such that a magnitude of the at least one bridge current decreases.

3. A system in accordance with claim 1, wherein said at least one controller is further configured to stop operation of said inverter in the partial current limiting regime when a predetermined stop operation time is reached.

4. A system in accordance with claim 1, wherein said at least one controller comprises a plurality of controllers, each controller of said plurality of controllers communicatively coupled to an associated UPS of said plurality of UPSs.

5. A system in accordance with claim 1, wherein said inverter comprises a single phase voltage source two level inverter.

6. A system in accordance with claim 1, wherein said inverter comprises a single phase voltage source three level inverter.

7. At least one controller for controlling a power supply system that includes a ring bus and a plurality of uninterruptible power supplies (UPSs), said at least one controller comprising:
a processor; and
a memory device communicatively coupled to said processor, said memory device storing executable instructions configured to cause said processor to:
compare at least one bridge current in each UPS of the plurality of UPSs to a predefined current limit; and, in the event the at least one bridge current in a respective UPS exceeds the predefined current limit:
modify gating signals for switches in said respective UPS such that an inverter operates in a partial current limiting regime defined by intermittent periods of full current limiting and linear mode operation, for a predetermined duration based on the portion of time the bridge current is actually being limited while operating in said partial current liming regime.

8. At least one controller in accordance with claim 7, wherein said processor is configured to modify gating signals such that a magnitude of the at least one bridge current decreases.

9. At least one controller in accordance with claim 7, wherein said processor is further configured to stop operation of the inverter in the partial current limiting regime when a predetermined stop operation time is reached.

10. At least one controller in accordance with claim 7, wherein to control the at least one bridge current, said processor is configured to control the at least one bridge current such that the inverter operates in the partial current liming regime for longer than possible under a full square wave current limiting regime.

11. At least one controller in accordance with claim 7, wherein to control the at least one bridge current, said processor is configured to control the at least one bridge current such that a single phase voltage source two level inverter operates in the partial current limiting regime.

12. At least one controller in accordance with claim 7, wherein to control the at least one bridge current, said processor is configured to control the at least one bridge current such that a single phase voltage source three level inverter operates in the partial current limiting regime.

13. A method of controlling a power supply system that includes a ring bus and plurality of uninterruptible power supplies (UPSs) each including an inverter, the method comprising:
monitoring at least one bridge current in each UPS of the plurality of UPSs;
comparing at least one bridge current in each UPS of the plurality of UPSs to a predefined current limit; and, in the event the at least one bridge current in a respective UPS exceeds the predefined current limit,
modifying gating signals for switches in said respective UPS such that the inverter operates in a partial current limiting regime defined by intermittent periods of full current limiting and a linear mode operation, for a predetermined duration based on the portion of time the bridge current is actually being limited while operating in said partial current liming regime.

14. A method in accordance with claim 13, wherein modifying gating signals comprises modifying gating signals such that a magnitude of the at least one bridge current decreases.

15. A method in accordance with claim 13, wherein modifying gating signals for switches in said respective UPS comprises controlling the at least one bridge current such that the inverter operates in the partial current liming regime for longer than possible under a full square wave current limiting regime.

16. A method in accordance with claim 13, wherein comprises controlling the at least one bridge current such that a single phase voltage source two level inverter operates in the partial current limiting regime.

17. A method in accordance with claim 13, wherein modifying gating signals for switches in said respective UPS comprises controlling the at least one bridge current such that a single phase voltage source three level inverter operates in the partial current limiting regime.

18. The system of claim 1, wherein the partial current limiting regime is sustainable for a variable time.

19. The system of claim 1, wherein the inverter delivers a square wave current during the periods of full current limiting.

20. The system of claim 1, wherein the duration is determined based on a measurement of the percentage of time the bridge current is actually being limited while operating in said partial current liming regime.

21. The system of claim 20, wherein the percentage of time the bridge current is actually being limited (LIM %) while operating in said partial current liming regime is determined by the equation:

$$\text{LIM \%} = \frac{1}{T_s} \int_{T_s} S_{limB}\, dt$$

where $T_s$ represents the period of a fundamental AC frequency and $s_{limB}$ represents a signal generated at the occurrence of bursts of full current limiting.

22. The system of claim 3 wherein the stop operation time is determined based on a thermal model that estimates the junction temperature of a semiconductor in the UPS.

23. The method of claim 13, further comprising stopping operation of the inverter in the partial current limiting regime when a predetermined stop operation time is reached.

* * * * *